S. G. REYNOLDS.
Steam Plow.
No. 35,261.
Patented May 13, 1862.
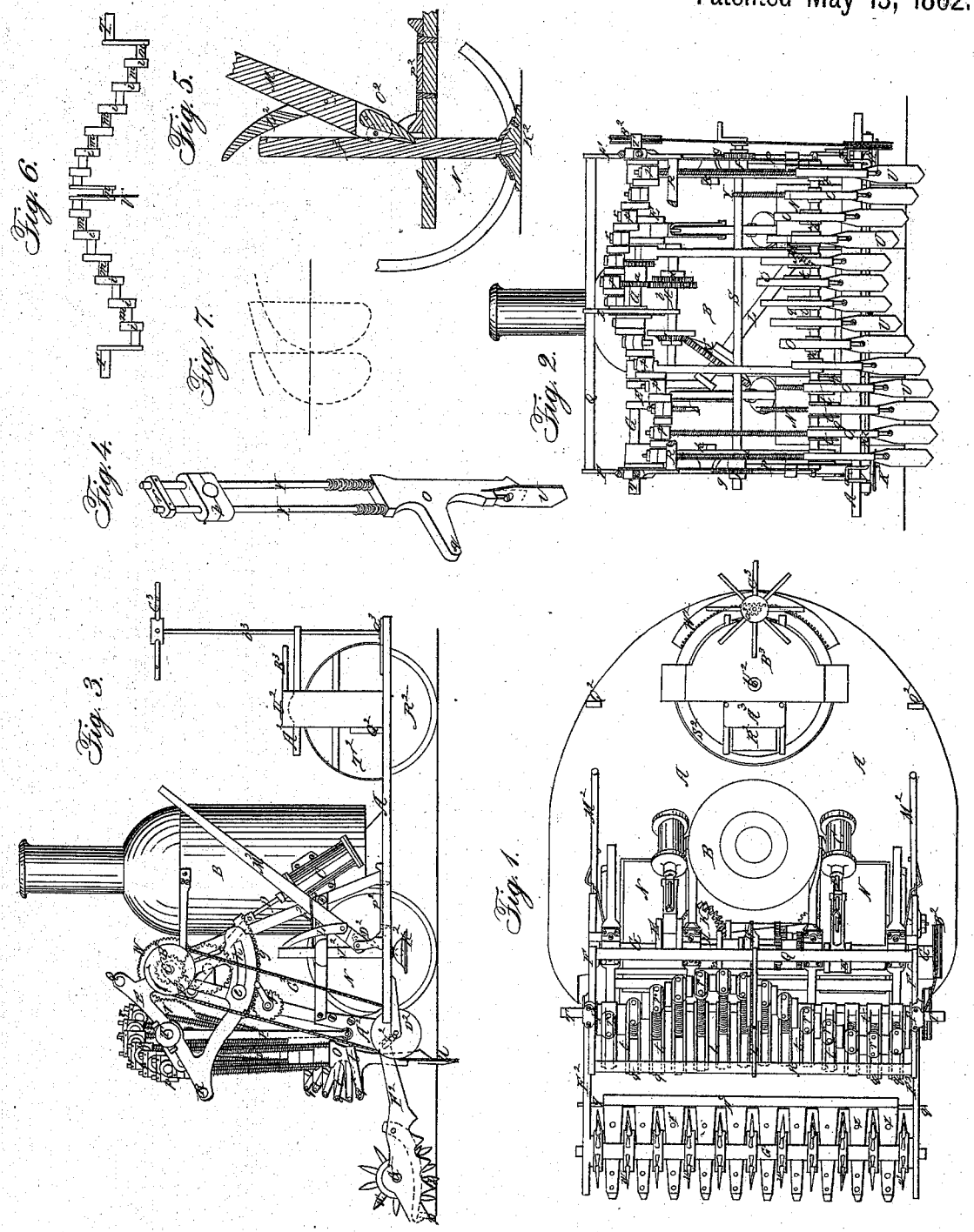

UNITED STATES PATENT OFFICE.

SAML. G. REYNOLDS, OF BRISTOL, RHODE ISLAND.

IMPROVEMENT IN POWER SPADING-MACHINES.

Specification forming part of Letters Patent No. 35,261, dated May 13, 1862.

*To all whom it may concern:*

Be it known that I, SAMUEL G. REYNOLDS, of Bristol, in the county of Bristol and State of Rhode Island, have invented certain Improvements in Power Spading-Machines, of which the following is a full, clear, and exact description, reference being had to the accompanying drawings, making part of this specification, in which—

Figure 1 is a plan; Fig. 2, a rear elevation; Fig. 3, a side elevation; Figs. 4, 5, 6, and 7, details to be referred to hereinafter.

In my improved spader a series of spades at the rear of the machine operate successively upon the ground, raise it, and pulverize it, the spades being actuated in a peculiar manner by means of cranks, as will be hereinafter more fully described.

The operating parts are carried by a platform, A, upon which is placed a suitable steam-boiler, B; and at C are seen the cylinders of the propelling-engine, through the piston-rods D of which and the cranks E rotary motion is communicated to the driving-shaft G, the cranks being set at right angles to each other. This boiler may even be replaced by a hot-air engine, or by any suitable power by which the machine may be rendered locomotive.

The details of the boiler and engine, as they form no part of my present invention, need not be further described.

H is a short horizontal shaft, which runs in stationary boxes in the frame of the machine, and is seen in position in Figs. 1 and 2. It is caused to revolve by being geared with the main shaft G, and carries a bevel-gear, I, with which engages a gear, K, upon the inclined shaft L. Upon the lower end of this shaft is a gear, M, which engages with a bevel-gear (not seen in the drawings) within the rim of one of the driving-wheels N, the two driving-wheels being secured permanently to the same axle, and thus the machine is propelled over the surface of the ground whenever the engine is in operation.

The power for the revolution of the axle H is communicated from the main driving-shaft through the gears *a* and *b*, and in order that the rate of progress of the machine may be varied as the tenacity of the soil may require it, any number of gears *c d*, of different relative sizes, may be employed for the purpose of connecting the shafts G and H with each other, the gears *a* and *c* being so arranged as to shift in and out of gear with their fellows.

The spading apparatus is carried by a frame composed of the quadrants F and rods Q and R. This frame pivots upon the ends of the main shaft G, and is elevated or swung upon its pivots, for the purpose of regulating the depth to which the spades are allowed to enter the ground, and also to clear them from the ground when the machine is to be transported from place to place, by means of gears *f* upon the shaft S, which engage with the rack-teeth *g* upon the bottom of the quadrants. The frame is held in the desired position, with the spades either in or out of operation, by bolts passing through the frame-work on each side of the machine, and working in slots *h* in the quadrants, the heads *e* of the bolts being drawn hard against the quadrants by nuts *k*, Fig. 2.

The spade-carriers O are suspended from a series of cranks, *m*, which revolve around the axis of the pivots T in the quadrants F. These cranks have all an equal throw; but they are arranged at different angular distances around the axis, so that the spades shall follow each other in their action and strike the earth successively as they descend one after another.

At the middle of the length of the series of cranks, and within its center in their axis of rotation, is a gear, V, which engages with a gear, W, upon the shaft G, and thus the cranks *m* are rotated around their common axis. At this point there is a supporting-bar, X, which is attached to the rods Q and R, and has a bearing in which rotates an axle, *n*, connected with the series of cranks and in their center of rotation. This bar thus serves to support and sustain the cranks, and there may be as many of them employed as may be deemed necessary in any given case, the number varying with the number of spades employed and with the strength of the cranks and their connections.

Two or more sets of gear, V and W, may be employed at different points along the shaft G and the crank-shaft for the purpose of driving the latter; or a connecting-rod and crank at the ends of the shaft may be used. The cranks are all connected into one rigid bar with their pivots T and $n$ by means of arms $i$, Fig. 6, and they are thus enabled to rotate around a common central axis without being connected with a continuous axle, which would interfere with other moving parts of the machine.

The spades U are attached to their carriers O by screws or otherwise, and may be of any desirable shape or required strength. From the carriers O rise the rods Y, which slide through the bearings or boxes $p$, by means of which the spade-carriers are suspended from the cranks $m$. The rods Y are connected together above the bearings $p$ by bars $r$, which rest upon the top of the boxes $p$.

Z is a shaft, suspended from the pivots T by the rods P. The ends of this shaft slide in slots made vertical, or nearly so, in metallic plates $A^2$. This shaft carries a series of arms or shackle-bars, $t$, of which there are two for each spade-carrier. These shackle-bars are connected with the carriers O at $q$, and thus as the carriers are elevated and depressed by the cranks $m$, they are also vibrated a certain distance around the shaft Z, and the spades are caused to move in a curve (represented in Fig. 7) very nearly vertical while the spade is descending to enter the ground, and then outward to loosen and break up or turn the earth. In certain cases the shackle-bars $t$ may be dispensed with, the lower ends of the spade-carriers being caused to work through slots or holes in the frame; or they may be driven by cranks; but this arrangement I do not consider so good as that represented in the drawings.

It will be observed that the motions of the spades in the machine represented in the drawings will constantly vary, either in direction or velocity, with respect to each other, by which they will be prevented from clogging and carrying up the earth between them, however close they may be placed to each other.

For the purpose of avoiding the breaking of the spades or any parts connected with them, or the spades encountering any obstruction—such as stones, logs, or a particularly unyielding stratum of earth—the rods Y are not connected rigidly with the machinery, but are pressed down to their work by springs $u$, which are seen broken away to show the rods Y in Fig. 4, but which surround these rods and bear up against the under side of the boxes $p$. When the spades strike an obstruction which they cannot penetrate the springs $u$ yield and the rods Y are forced up through the boxes $p$, as seen in Fig. 4. Other means may be employed of effecting this yielding of the spade to avoid breakage or injury without materially departing from my invention. For instance, the spade may be attached to the end of long spring-handles, like hoe-handles, and be operated by cranks above, so as to have very nearly the motions which they have in the machine represented in the drawings.

It is also obvious that the spades should be endowed with some capability of yielding in a horizontal direction, that they may not be broken or bent should they encounter an unyielding obstruction when they are thrust out to pulverize the soil. This may be accomplished by making the rods Y of spring-steel or by connecting them with the shackle-bars $t$ by strong spiral springs. By placing the spades behind the carrying-wheels N the latter are caused to run only upon the unplowed ground, and a great economy of the power required to drive the machine is the result, and the freshly-moved ground is not compressed. Upon the end of the main shaft G is a pulley, $B^2$, from which a band or chain, $C^2$, runs to a similar pulley, $D^2$, upon the end of a shaft, $E^2$, upon which shaft are two cranks, $Z^2$, to which are connected the handles or shafts $F^2$ of a harrow, which is connected with the spading-machine in the following manner:

A shaft, $G^2$, furnished with the harrow-teeth $w$, is pivoted to the handles $F^2$, so that as the harrow proceeds the harrow-teeth rotate in contact with the soil. $H^2$ is a harrow-frame, composed of separate slats or bars, which project in between the circles of rotating teeth $w$, and which are also furnished with teeth $x$, which enter the ground and drag along through it. The harrow-frame $H^2$ is suspended from the arms $F^2$ by a rod, $y$. It is obvious that in whichever way this harrow is drawn while one set of teeth, $w$, rotate through the soil, the other set, $x$, drag longitudinally through it, and that these two sets of teeth, while undergoing this counter action, are in the immediate vicinity of each other, thus crushing and grinding the clods between them instead of merely striking or moving them to one side, as is the case with the simple rotating or dragging harrow. The details of this particular harrow will form the subject of another application for Letters Patent, and will not therefore be further described at this time.

The action of the harrow when connected with a machine of this character by means of cranks, as above described, is peculiar, whether the harrow rotates or not, and whether it be composite like the one represented in the drawings or composed of a single set of similar teeth, for on the motion of the crank in one direction the harrow will be caused to advance, and on the return movement of the crank it will recede from the machine, and it will thus keep up a continual back-and-forth motion through the ground, which will greatly aid in crushing the clods and pulverizing the soil. It will also be seen that the shafts or handles of the rake are raised and depressed every revolution of the cranks $Z^2$, thus giving a peculiar rocking motion to the harrow, which assists the teeth in clearing themselves, and also facilitates their operation. That the harrow may not be fouled or clogged by stones, the teeth should be obtuse-pointed and stout.

It is manifest that as the two carrying-wheels N are fixed to the same shaft, some method of turning the machine will be required at the ends of the furrow. For this purpose the following device is employed: Upon each side of the machine is a post, I², which has at its lower end a broad circular foot, K², the post and foot being held up in the position seen in Fig. 3 by the pawl L² upon the lever M², which enters a notch in the post, the lever being held elevated, as seen, by a hooked rod, N², or otherwise. On arriving at the end of a furrow the post I² is dropped upon the ground, and another pawl, O², is pushed by a sliding bar, P², into a notch in the post, and the lever is brought down and locked under a catch, Q², by which means the weight of one side of the machine is thrown upon the foot K², and the adjacent wheel N is raised from contact with the ground. If, now, the action of the machine be continued, it will pivot round upon the foot K², spading up a semicircular piece as it goes round, and as the foot K² is directly in advance of the extreme side spade, the spades are brought into the proper position to commence work without leaving an unspaded strip. It is obvious that the post I² must be in a line with the axis of revolution of the wheels N.

The method in which the machine is guided or steered by the conductor will now be described.

At the advance end of the machine is a third carrying-wheel, R², which is pivoted to a turn-table consisting of a horizontal plate, S², and vertical side plates, T², the wheel R² pivoting in the side plates, T², and the whole turn-table rotating horizontally upon a vertical axle at V² in a frame, V², rising from the platform A. The lower plate, S², of the turn-table rotates in a circular opening in the platform, and at the advance edge of this opening a circular rack, W², is secured, the teeth of which engage with a pinion, a³, upon the lower end of a windlass-shaft, b³, the lower end of which is stepped into the plate S². The shaft is steadied by the top plate, A³, of the turn-table, or by a bar projecting therefrom. B³ is a stationary platform attached to the frame V², upon which the conductor stands to guide or steer the machine by operating the windlass C³. It is obvious that the wheel R² should be so turned that its axis shall pass through the center of the post I² whenever the machine is to be turned. In lieu of the arrangement above described, the rack W² may be placed upon the turn-table and the pinion a² upon the platform.

In certain soils the momentum of the revolving spades with the parts attached thereto would be sufficient to cause them to penetrate the earth, even were the springs $u$ dispensed with; but I prefer the construction above described as that which is best adapted to all soils and most conducive to lightness and to celerity of operation. Instead of the device of lever and pawls here shown for raising and lowering the foot K², a steam-jack or worm-gear and cog-wheel to be operated by the engine may be used.

What I claim as my invention, and desire to secure by Letters Patent, is—

1. The combination of the series of cranks $m$, set in a curved or spiral line, and the shackle-bars $t$, or their equivalents, with the spade-carriers O, for the purpose of giving the required motion to the spades, as shown in Fig. 7, to enter the ground, pulverize the soil, and clear themselves, as described.

2. The yielding spade-carriers, operating as set forth, for the purpose specified.

3. In combination with a power spading-machine, the pivot K², placed within the axis of the bearing-wheels, and operating as set forth.

4. The combination of the mechanical spading-machine with a harrow, when the harrow follows the machine and is operated by cranks in the manner substantially as set forth, for the purpose specified.

S. G. REYNOLDS.

Witnesses:
 THOS. R. ROACH,
 P. E. TESCHEMACHER.